United States Patent Office 3,652,501
Patented Mar. 28, 1972

3,652,501
WATER SOLUBLE ALKYD RESINS
Kenneth H. Albers, Alden E. Blood, and Thomas C. Snapp, Jr., Longview, Tex., assignors to Eastman Kodak Company, Rochester, N.Y.
No Drawing. Filed May 28, 1970, Ser. No. 41,577
Int. Cl. C08g 20/30
U.S. Cl. 260—75 N
16 Claims

ABSTRACT OF THE DISCLOSURE

This invention relates to a curable, water-soluble alkyd resin useful in an improved protective coating composition. The resin is a polyesteramide of at least one polycarboxylic acid and at least one polyhydroxyalcohol, the alcohol comprising a substantial amount of N,N-bis[2-hydroxyethyl]-2-hydroxyethoxyacetamide and preferably one additional polyhydroxyaliphatic or cycloaliphatic alcohol, e.g. 1,4-cyclohexane dimethanol.

---

This invention relates to novel alkyd resins that contain the trioletheramide, N,N-bis[2-hydroxyethyl]-2-hydroxyethoxyacetamide. More particularly, the invention is concerned with the preparation of curable, water-soluble polyesteramides of the aforementioned trioletheramide and a polycarboxylic acid(s) useful in the preparation of protective coating compositions having improved impact-resistance and hardness.

Alkyd resins comprising residues of polyhydroxy compounds, such as glycerine, trimethylolpropane, and pentaerythritol and polycarboxylic acids in the polymeric chain have heretofore been utilized to provide surface coating compositions such as paint; see U.S. Pat. No. 3,213,063. Other alkyd resins such as certain polyesteramides are also known from the prior art as exemplified by U.S. Pat. Nos. 3,447,916; 2,644,773; 2,831,813; 2,944,-025; 3,341,573; 3,083,188; French Pat. No. 1,542,811; Canadian Pat. No. 812,738; Belgian Pat. No. 732,008; and Japanese Pat. No. 16,911/69. Many of these polyesteramides, however, are oil-soluble materials and are used as additives for petroleum products. Certain of these various types of alkyd resins do not provide satisfactory protective coating compositions unless subjected to a separate hot air drying curing operation. Moreover, many of these alkyd resins when used in protective coating compositions require the use of expensive polycarboxylic acid compounds if the resultant alkyd resin used in the protective coating composition is to be water-soluble. In addition, protective coating compositions prepared from certain of these prior art alkyd resins are less impact-resistant and less hard than is desired in many cases.

None of the prior art alkyd resins, such as those noted above, contain the residue of the trioletheramide, N,N-bis[2-hydroxyethyl]-2-hydroxyethoxyacetamide. This particular trioletheramide has unexpectedly been found to possess a high degree of water solubility. A description of this novel trioletheramide may be found in copending U.S. patent application Ser. No. 41,576, filed May 28, 1970, which is hereby incorporated in the present application by reference thereto.

It is an object of the present invention to provide a polyesteramide of the aforementioned trioletheramide in the polymeric molecular chain.

Another object of the invention is to provide polyesteramides capable of being used as protective coating compositions for metallic and other types of substrates.

A further object of the invention is to provide water-soluble, curable polyesteramides capable of being utilized in a protective coating composition which, when coated onto metallic substrates and baked, cure to form protective surface coatings exhibiting improved hardness and impact resistance in addition to other desirable properties such as solvent and weather resistance, flexibility and gloss.

It is a further object of the present invention to provide improved water-soluble protective coating compositions which possess such useful properties.

It is still another object of the present invention to provide new water-soluble, curable polyesteramide resins capable of being used in protective coating compositions.

Another object of the present invention is to provide polyesteramide resins suitable for use in protective coating compositions which are curable without a separate hot air drying operation prior to baking the protective coating compositions on a substrate.

These and other objects of the present invention will become apparent from the following description.

According to the present invention there is provided a curable, water-soluble polyesteramide of (A) a polycarboxylic acid component comprising at least one polycarboxylic acid compound having 4 to 20 carbon atoms and selected from the group consisting of aliphatic and aromatic acids and (B) a polyhydroxy alcohol component, said alcohol component comprising a substantial amount of a compound having the formula:

(I) 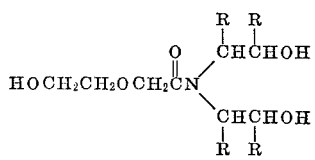

wherein each R is a member selected from the group consisting of hydrogen, methyl and ethyl, with the proviso that the ratio of hydroxyl groups in the alcohol component to carboxyl groups in the acid component is within the range of about 1.0 to about 1.6, preferably 1.2 to 1.4, and that said components through an oxy-carbonyl linkage form integral recurring ester units of the polyesteramide molecular chain. Advantageously, the polyhydroxy alcohol component comprises, in addition to the trioletheramide compound of Formula I shown hereinabove, a substantial amount of an aliphatic or cycloaliphatic alcohol having 2 to 10 carbon atoms such as neopentyl glycol or 1,4-cyclohexanedimethanol.

In a further aspect of the present invention there is provided a water-soluble protective coating composition comprising in admixture about 1 to about 70 weight percent, and preferably about 10 to about 50 weight percent, of the above-described polyesteramides, a volatile base, and water.

In another aspect of the invention there is provided a process for preparing the above described polyesteramides which comprises heating a mixture of the above-described polycarboxylic acid component and polyhydroxyalcohol component within a temperature range of from about 110° C. to about 260° C. until a polyesteramide reaction product having an acid number between about 30 to about 100 is obtained. Preferably, said mixture is heated in the presence of an azeotropic medium, e.g. toluene, to remove the water of reaction. In addition, a polyester catalyst such as lead oxide, zinc acetate, antimony oxide and the like may be utilized in amounts of about 0.05 to about 5.0 weight percent based on the weight of said reaction mixture excluding the azeotropic media if used. However, it is preferred to carry out this process without a catalyst.

The novel polyesteramides of the present invention are a particular value because they can be converted to a cross-linked, insoluble form, as for example in a baked protectice coating composition, without the use of a separate curing operation, such as air drying, before baking the protective coating composition. Moreover, inasmuch as the water-solubility of the present polyesteramide resins is due to the water-solubility of the novel trioletheramide residue in the polymeric molecular chain, it is unnecessary to use the more expensive polycarboxylic acid compounds presently used in producing conventional water-soluble alkyd resins. That is, conventional water-soluble alkyd resins prepared from such polyhydroxy alcohols as glycerine, dimethanol propionic acid, trimethylolethane, trimetholpropane, and pentaerythritol generally require tri- and tetracarboxylic acids such as trimellitic acid and anhydride, and bezophenone tetracarboxylic acid, etc. Accordingly, these alkyd resins are made water-soluble by neutralization of the unreactive carboxyls in the tri- and tetracarboxylic acid components of the resins. Moreover, these conventional water-soluble alkyd resins also utilize the tri- and tetracarboxylic acid to provide cross-linking of the alkyd resin. In contrast, water-solubility of the polyesteramide of the present invention is provided by the recurring units of N,N-bis[2-hydroxyethyl] - 2 - hydroxyethoxyacetamide residue appearing in the polymeric molecular chain. Hence, less expensive polycarboxylic acid components such as adipic acid and phthalic acids may be utilized, and, in fact, are preferred.

The novel polyesteramide resins of the present invention may vary in properties depending upon the particular amount and types of materials comprised by the polyhydroxy alcohol component and the polycarboxylic acid component. For example, the water-solubility of the polyesteramide may vary depending upon the amount of the trioletheramide residue contained in the polymeric molecular chain. In addition, other properties of the alkyd resin such as glossiness, hardness, and impact-resistance will vary to some extent depending upon the additional types of polyhydroxy alcohol compounds utilized as part of the alcohol component. For example neopentyl glycol and 1,4-cyclohexanedimethanol provide an alkyd resin with excellent gloss, hardness and impact-resistance. In general, however, the acid number of the polyesteramide product is within the range of from about 5 to about 100.

The polycarboxylic acid or acids comprising the polycarboxylic acid component of the instant polyesteramide resin may be selected from those acids or anhydrides having from about 4 to about 20 carbon atoms and selected from the group consisting of aliphatic (by aliphatic is meant alkyl and alkenyl) and aromatic acids and anhydrides having at least 2 carboxyl groups. Preferably, the polycarboxylic acid is a dicarboxylic acid or anhydride having from 4 to about 12 carbon atoms. Examples of these preferred acids and anhydrides include succinic, glutaric, adipic, suberic, sebacic, phthalic, isophthalic, terephthalic, mixtures of the foregoing compounds and the like. Tri- and tetrafunctional carboxylic acid compounds such as trimellitic anhydride, benzophenone tetracarboxylic acid, dimethanol propionic acid, etc. may also be used; however, as pointed out above, these tri- and tetrafunctional acids are more expensive and unnecessary, hence not preferred. Especially suitable polycarboxylic acids are isophthalic and adipic acid and mixtures of the same.

The polyhydroxy alcohols or polyols as they are often called which may be used in the polyhydroxy alcohol component of the polyesteramide of the present invention to complement the novel trioletheramide described hereinabove, are aliphatic glycols, including cycloaliphatic glycols, containing at least 2 carbon atoms, preferably up to 10 carbon atoms. Suitable straight chain aliphatic glycols include polymethylene glycols such as, ethylene, propylene, dipropylene, tripropylene, hexamethylene, diethylene, triethylene, butylene, heptylene, etc. Glycols containing 1 or 2 secondary groups can also be used such as 1,2 - propylene glycol; 2,3 - hexanediol; 2,3-butanediol; and the like. Among the cycloaliphatic glycols that may be used are cycloalkane glycols such as 1,2-cyclohexanedimethanol; 1,2-dihydroxy cyclohexane; 1,3-cyclohexanedimethanol; 1,4-cyclohexanedimethanol; and the like. Preferred glycols are the alkyl and cycloalkyd glycols. Especially useful glycols are neopentyl glycol and 1,4-cyclohexanedimethanol. Use of mixtures of any two or more of these glycols is also contemplated by the present invention. Advantageously, the amount of aliphatic glycol contained in the polyhydroxy alcohol component of the polyesteramide in addition to the trioletheramide described above, varies from about 25 to about 70 weight percent of the total amount of the polyhydroxy alcohol component.

Preparation of the polyesteramides of the invention can be effected by condensing the polyhydroxy alcohol component and the polycarboxylic acid component in accordance with general methods known in the alkyd resin art, for example, by a fusion cook or by the solvent cook technique using an azeotropic solvent such as, for example, toluene, to remove the water of reaction. The order of addition of the various reactants comprised by the polyesteramide reaction products of the instant invention is not critical. All reactants may, for example, be mixed together and heated or the reaction can be carried out in stages at which various reactants may be added. Although catalysts such as those noted hereinabove may be utilized, it is preferred that the reaction be carried out without catalyst. Although the general reaction technique used is old, it has been discovered that this particular reaction is preferably continued until the polyesteramide reaction product has an acid number of from between about 5 to about 100 which generally means reaction time will vary from about 1 to about 12 hours or longer. In addition, it has been discovered that the temperature for carrying out this particular reaction process varies from about 110° C. to about 260° C. The preferred reaction temperature is within the range of about 120° C. to about 200° C.

The polyesteramide resin prepared as described above can be stripped of solvent, if any is used. Having thus obtained the resin in a viscous liquid form, the protective surface coating composition of the present invention may then be prepared as follows: the polyesteramide resin and an aqueous media containing a volatile base such as ammonia or preferably N,N-dimethylethanolamine are mixed together. The polyesteramide may be in a liquid form when admixed with the basic aqueous media preferably at a temperature within the range of 60° C. to 80° C. The basic aqueous media dissolves the polyesteramide resin and neutralizes free acid groups of the resin. As a result, there is obtained a clear resin solution with a pH generally from about 7 to about 9, although resin solutions with slightly lower pH's may also be obtained. Some of the water in the aqueous media in which the polyesteramide is dissolved may be replaced by alcohols such as ethanol, tertiary butanol, ether alcohols, ether alcohol esters, etc. since the polyesteramide of the present invention is alcohol-soluble as well as water-soluble. This clear resin solution provides an excellent surface coating composition for metallic and other substrates. In addition to modifying the aqueous media of the surface coating composition by partial substitution of alcohols as noted above, the surface coating composition may also be modified by the addition of certain pigments, such as $TiO_2$, and the resulting mixtures may be used as an enamel paint for metal substrates. Advantageously, a surface coating composition according to the present invention contains about 1 to 70 weight percent polyesteramide.

The polyesteramide protective coating composition of the present invention may be coated on a variety of substrates as by brushing, dipping, spraying, stirring or impregnating. The coating composition, when applied on the substrate, is baked at temperatures between 125° C. and 180° C., thereby curing by loss of volatile base and condensation of free carboxyl and hydroxyl groups. The resulting baked coating is glossy, flexible, solvent and weather resistant, and possesses improved impact-resistance and hardness. The coating composition is especially advantageous over known water-soluble coating compositions in that there is no need for any special curing operation such as air drying prior to baking. In addition, the baking temperature noted above, i.e. 125° C. to 180° C., is substantially less than the temperature required to bake conventional alkyd enamels, i.e. 200° C. or higher. Moreover, when baked and cured, the surface coating composition of the present invention yields coatings which are harder and more impact-resistant than most other conventional coatings as will be demonstrated hereinafter. Baking time for the coating composition of the invention varies from about 10 minutes to about 40 minutes. Although, longer times may be used, some cratering and yellowing of the coating may occur when these longer baking times are used.

The following examples are included to further illustrate the present invention. In these examples, the term trioletheramide refers to the compound N,N-bis[2-hydroxyethyl]-2-hydroxyethoxyacetamide.

EXAMPLE 1

This example demonstrates the typical process used to produce the water-soluble polyesteramide of the present invention. A 1-liter, 4-neck, round-bottom flask is fitted with a mechanical stirrer, a thermometer, a nitrogen gas dispersion tube, and a Dean-Stark trap which in turn is fitted on a steam jacketed condenser beneath a water-cooled condenser. The flask is charged with 100 milliliters toluene, 107.9 grams of isophthalic acid, 51.1 grams of adipic acid, 86.6 grams of neopentyl glycol, and 64.6 grams of the trioletheramide, N,N-bis[2-hydroxyethyl]-2-hydroxyethoxyacetamide. The mixture is heated to 140° C. and maintained at this level for about 5 hours. During this time removal of the water of reaction occurs. The resulting product is a highly viscous homogeneous liquid having an acid number of 58. This liquid is the polyesteramide of the present invention. Having obtained the polyesteramide resin, the resin is then dissolved in a solution of 2-dimethylaminoethanol in aqueous t-butyl alcohol to give an aqueous-alcoholic solution of the polyesteramide having a pH of from 7 to about 9. This solution contains 40% by weight of the polyesteramide resin. A curing agent of hexamethoxymethylmelamine, although not necessary, is added to the resin solution in an amount of 15 weight percent based on the weight of the polyesteramide resin contained in the solution. The polyesteramide solution is then pigmented with $TiO_2$ at a pigment to resin ratio of 0.7:1. The resulting mixture is milled for about 16 hours. A film of this resulting mixture is applied at a thickness of about 0.0015 inch to a steel plate and then baked without preliminary drying at about 150° C. for about 30 minutes. The baked enamel coating exhibits good gloss, does not soften when a few drops of acetone is placed on the film, and does not crack when the coated steel plate is given a 180° bend on a ¼-inch conical mandrel. In an impact hardness test, the baked steel plate coating is not damaged by an impact of 90 inch pounds. In addition, the baked coating exhibits a pencil hardness greater than 6H.

EXAMPLE 2

This example demonstrates the polyesteramide of the present invention containing 1,4-cyclohexanedimethanol as an additional aliphatic polyhydroxy compound complementing the trioletheramide rather than the neopentyl glycol used in Example 1. The reaction apparatus used in this apparatus is identical to that described above in Example 1. In this example, the flask is charged with 100 milliters of toluene, 51.1 grams of adipic acid, 108.0 grams of isophthalic acid, 121.8 grams of 1,4-cyclohexanedimethanol and 58.4 grams of the trioletheramide, N,N-bis[2-hydroxyethyl]-2-hydroxyethoxyacetamide. The mixture is heated to 135° C. and then during a 10 hour interval is slowly raised to 155° C. During this time the water of reaction is removed. The resulting polyesteramide product is a highly viscous homogeneous liquid having an acid number of 62. This alkyl resin of polyesteramide is then dissolved in an aqueous alcoholic solution of ethanol and water. The solution contains 50 percent by weight ethanol. The solution also contains ammonium hydroxide as the volatile base used to neutralize free acid groups contained in the polyesteramide resin. The resulting resin solution contains 40 percent by weight polyesteramide and has a pH of 7 to 9. Hexamethoxymethylmelamine is added as a curing agent in an amount of 12.5 weight percent based on the weight of the alkyd resin content. A coating composition of enamel which contains a $TiO_2$ pigment is then prepared according to the procedure described above in Example 1. A 0.001 inch film of this enamel coating composition mixture is painted on a steel plate and is baked without preliminary drying at about 160° C. for about 30 minutes. The baked coating has a good gloss, does not soften when a few drops of acetone are placed on the coating, and does not crack when the steel plate test panel is given a 180° bend on a ⅛-inch conical mandrel. The pencil hardness of the coating is greater than 6H, and it is not damaged by an impact of 150 inch pounds.

This example shows that other alcohols in addition to t-butanol noted in Example 1 above may be used as a cosolvent for the polyesteramide resin which is being processed into a protective surface composition. In addition it shows that other bases in addition to the 2-dimethylaminoethanol used in Example 1 above may be used to neutralize the free acid contained in the polyesteramide which is dissolved in the aqueous-alcoholic media.

EXAMPLE 3

This example demonstrates that propylene glycol, phthalic acid, and succinic acid can be utilized to produce a satisfactory resin in accordance with the present invention. It also shows that film can be produced without the addition of an external cross-linking agent such as hexamethoxymethylmelamine used in Examples 1 and 2.

In this example the reaction apparatus and procedure used to prepare the polyesteramide resin is identical to that described above in Example 1. Here, 64.3 grams of propylene glycol, 58.4 grams of the trioletheramide, 108.0 grams of phthalic acid, and 41.3 grams of succinic acid are charged to the reaction flask. The flask is heated to a temperature of 132° C. for a time of about 10 hours. The resultant polyesteramide resin product has an acid number of 86. A coating composition prepared from this polyesteramide in a manner identical to that described in Example 1 above passes the acetone test described in Example 1, has a pencil hardness of 6H and an impact resistance of 20 inch pounds.

EXAMPLE 4

This example demonstrates that 2,2,4-trimethylpentan-1,3-diol and phthalic anhydride can be utilized to produce a satisfactory polyesteramide resin in accordance with the present invention. In this example a polyesteramide resin is again prepared as described by the procedure set out in Example 1 above. 58.4 grams of the trioletheramide, 96.2 grams of phthalic anhydride, 51.1 grams of adipic acid, and 123.5 grams of 2,2,4-trimethyl-pentan-1,3-diol are charged to the reaction flask. The flask is heated to a temperature of about 160° C. for a time of about 22 hours. The acid number of the resultant polyesteramide resin obtained therefrom is 46. An enamel prepared by the procedure of Example 1 hereinabove is made from this polyesteramide resin. The enamel is applied as a film of 0.001 inch thick on a steel plate and without preliminary drying is baked at about 150° C. for about 30 minutes. This baked film passes the acetone test described in Example 1 and has excellent gloss. The pencil hardness and impact resistance of the film is 6H and 20 inch pounds, respectively.

EXAMPLE 5

This example demonstrates that ethylene glycol, maleic anhydride and adipic acid without an aromatic dicarboxylic acid can be utilized to produce the satisfactory polyesteramide resin according to the present invention. It also demonstrates that a large excess of hydroxyl groups in comparison to carboxyl groups may be used without deleterious effect.

In this example there is approximately a 45 percent excess of hydroxy groups. This resin is prepared by the procedure and in the reaction apparatus described in Example 1. In this example 69.1 grams of ethylene glycol, 131.4 grams of adipic acid, 9.8 grams of maleic anhydride and 46.2 grams of the trioletheramide are charged to the reaction flask. The flask is heated to a temperature of about 120° C. for a time of about 7 hours. The resultant polyesteramide resin obtained has an acid number of 85. An enamel surface coating composition is prepared from this polyesteramide resin using the procedure described in Example 1 hereinabove. A film of this enamel is applied to a steel plate and without preliminary drying is baked at about 350° F. for about 30 minutes. The baked film passes the acetone test described in Example 1, has a pencil hardness of 3H, and an impact resistance of 20 inch pounds.

EXAMPLE 6

This example demonstrates that terephthalic acid and diethylene glycol can be utilized to produce a satisfactory polyesteramide resin according to the present invention. In this example, excess hydroxyl content of the initial reactant is lowered so that there is only about a 10 percent excess of hydroxyl groups over the amount of carboxyl groups.

This resin is prepared according to the procedure and in the reaction apparatus described in Example 1 above. In this example 54.9 grams of diethylene glycol, 80.3 grams of trioletheramide, 83.0 grams of terephthalic acid and 73.0 grams of adipic acid are charged to the reaction flask. The flask is heated to about 125° C. for a time of about 6 hours. The resultant polyesteramide resin obtained is then converted into a protective coating composition enamel by the procedure described in Example 1 hereinabove. A thin 0.0015 inch film of this enamel is applied on a steel plate and without preliminary drying is baked at about 300° F. for about 30 minutes. The baked film exhibits good gloss, passes the acetone test described in Example 1, and does not crack when the test panel of steel plate is given a 180° bend on a ⅛-inch conical mandrel. The pencil hardness of the baked film is greater than 6H, and it is not damaged by an impact of 140 inch pounds.

EXAMPLE 7

In this example hydroxypivalyl hydroxypivalate is utilized as one of the polyhydroxy components of the polyesteramide resin of the present invention. The resin in this example is prepared by the procedure and in the reaction apparatus described in Example 1 hereinabove. In this case 58.4 grams of the trioletheramide, 172.5 grams of hydroxypivalyl hydroxypivalate, 83.0 grams of isophthalic acid, and 73.0 grams of adipic acid are charged to the reaction flask. The flask is heated to about 150° C. for a time of 6 hours. The resultant polyesteramide resin has an acid number of 67. An enamel prepared from this polyesteramide resin by the procedure described in Example 1 above is painted at a thickness of 0.001 inch on a steel plate and without preliminary drying is baked at about 350° F. for about 30 minutes. The baked film has a good gloss, passes the acetone test described in Example 1 above, and does not crack when the test panel is given a 180° bend on a ⅛-inch conical mandrel. The pencil hardness of this film is 4H, and it is not damaged by the full force of the impact tester utilized which is greater than about 160 inch pounds.

EXAMPLE 8

This example demonstrates that the substitution of glycerine for the trioletheramide used in the present invention produces a water-insoluble alkyd, rather than a water-soluble alkyl resin. In this case, 26.0 grams of glycerine, 88.0 grams of neopentyl glycol, 108.0 grams of isophthalic acid, and 51.1 grams of adipic acid are charged to the reaction flask according to the procedure described in Example 1. The flask is heated to a temperature varying from 125° C. to 180° C. over a period of 28 hours. The resulting alkyd resin product has an acid number of 97. This alkyd resin product and ammonium hydroxide are added to 400 milliliters of a water-ethanol solution containing 50 percent by weight water until a pH of 8 to 10 is reached. The alkyd resin remains insoluble and forms a sludge in the aqueous ethanol solution. An amount of hexamethoxymethylmelamine equal to 12.5 weight percent of the alkyd resin content is added to the aqueous-ethanol mixture. The alkyd resin still remains an insoluble sludge. An attempt is made to prepare this alkyd resin-containing mixture into an enamel using the procedure described in Example 1. However, the resulting composition cannot be satisfactorily painted on a steel test panel.

Results similar to those described in Example 8 are obtained when trimethylolpropane or pentaerythritol are substituted for the trioletheramide used in the alkyd resin of the present invention. That is, the resultant alkyd is water-insoluble and a satisfactory enamel cannot be prepared by using the procedure described in Example 1.

EXAMPLE 9

This example demonstrates that ethylene glycol, maleic anhydride and adipic acid without an aromatic dicarboxylic acid can be utilized to produce the water-soluble polyesteramide resin according to the present invention. It also demonstrates that a large excess of hydroxyl groups in comparison to carboxyl groups may be used without deleterious effect. In this example there is approximately a 45 percent excess of hydroxy groups. This resin is prepared by the procedure and in the reaction apparatus described in Example 1. In this example 69.1 grams of ethylene glycol, 131.4 grams of adipic acid, 9.8 grams of maleic anhydride and 46.2 grams of the trioletheramide are charged to the reaction flask. The flask is heated to a temperature of about 120° C. for a time of about 7 hours. The resultant polyesteramide resin obtained has an acid number of 85, and was diluted with water to form a 40 percent non-volatile in water solution. An enamel surface coating composition is prepared from this polyesteramide resin using the procedure described in Example 1 hereinabove. A film of this enamel is applied to a steel plate and without preliminary drying is baked at about 350° F. for about 30 minutes. The baked film passes the acetone test described in Example 1, has a pencil hardness of 3H, and an impact resistance of 20 inch pounds.

The invention has been described in detail with particular reference to preferred embodiments thereof, but it will be understood that variations and modifications can be effected within the spirit and scope of the invention as described hereinabove.

We claim:

1. A curable, water-soluble polyesteramide of (a) a polycarboxylic acid component containing at least one polycarboxylic acid compound having 4 to 20 carbon atoms and selected from the group consisting of aliphatic and aromatic acids or anhydrides, and mixtures thereof, and (b) a polyhydroxy alcohol component comprising in substantial amount a compound having the formula

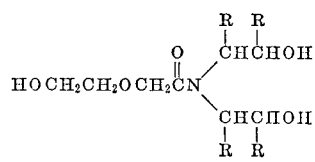

wherein each R is a member selected from the group consisting of hydrogen, methyl and ethyl, the ratio of the hydroxy groups in said alcohol component to carboxyl groups in said acid component being within the range of 1.0:1 to 1.6:1, said components through an oxy-carbonyl linkage forming integral recurring ester units for the polyesteramide molecular chain.

2. A polyesteramide according to claim 1 wherein said polyhydroxy alcohol component comprises in addition to the trioletheramide compound a substantial amount of an aliphatic or cycloaliphatic alcohol having 2 to 10 carbon atoms.

3. A polyesteramide according to claim 2 wherein said alcohol having 2 to 10 carbon atoms is selected from the group consisting of ethylene glycol, propylene glycol, dipropylene glycol, tripropylene glycol, hexamethylene glycol, diethylene glycol, triethylene glycol, butylene glycol, hexylene glycol, neopentyl glycol, 1,4 - cyclohexanedimethanol, hydroxypivalyl hydroxypivalate 2,2,4-trimethylpentane-1,3-diol.

4. A polyesteramide according to claim 3 wherein said alcohol having 2 to 10 carbon atoms is selected from the group consisting of 1,4-cyclohexanedimethanol, propylene glycol or neopentyl glycol.

5. A polyesteramide according to claim 11 wherein said polycarboxylic acid compound comprises dicarboxylic acids selected from the group consisting of diglycolic acid, maleic acid, succinic acid, glutaric acid, adipic acid, suberic acid, sebacic acid, phthalic acid, isophthalic acid and terephthalic acid.

6. A polyesteramide according to claim 6 wherein said polycarboxylic acid compound is selected from the group consisting of isophthalic acid, adipic acid, terephthalic acid, mixtures of isophthalic acid and adipic acid, and mixtures of terephthalic acid and adipic acid.

7. A polyesteramide according to claim 1 wherein said polycarboxylic acid compound comprising the polycarboxylic acid component is selected from aliphatic and aromatic acids having 4 to 12 carbon atoms.

8. A polyesteramide according to claim 2 wherein said polycarboxylic acid compound comprising the polycarboxylic acid component is selected from aliphatic and aromatic acids having 4 to 12 carbon atoms.

9 A polyesteramide according to claim 2 wherein said polycarboxylic acid compound comprising the polycarboxylic said component comprises anhydrides of diglycolic acid, maleic acid, succinic acid, glutaric acid and phthalic acid.

10. A polyesteramide according to claim 2 wherein said polycarboxylic acid compound comprising the polycarboxylic acid component is phthalic anhydride.

11. A polyesteramide according to claim 2 wherein said polycarboxylic acid compound comprising the polycarboxylic acid component is a mixture of phthalic anhydride and adipic acid.

12. A polyesteramide according to claim 2 wherein the percent of said alcohol having 2 to 10 carbon atoms is between about 25 to about 70 weight percent of the total amount of the polyhydric alcohol component.

13. A polyesteramide according to claim 2 wherein the ratio of the hydroxy groups in said alcohol component to carboxyl groups in said acid component is between about 1.2:1 to 1.4:1.

14. A polyesteramide according to claim 2 wherein the acid number of the polyesteramide product is within the range of from about 5 to about 100.

15. A curable, water-soluble polyesteramide comprising:
(A) a polycarboxylic acid component containing at least one compound having from 4 to 12 carbon atoms selected from the group comprising aliphatic and aromatic acids, anhydrides, or mixtures thereof; and
(B) a polyhydric alcohol component comprising
(a) at least one trioletheramide compound having the formula

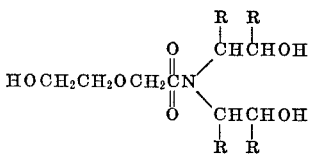

wherein each R is a member selected from the group consisting of hydrogen, methyl and ethyl, and
(b) at least one polyhdric aliphatic or cyclo aliphtic alcohol having 2 to 10 carbon atoms, the amount of polyhydric aliphatic or cycloaliphatic alcohol contained in the polyhydric alcohol component being from about 25 to about 70 weight percent of the total amount of the polyhydric alcohol component;
the ratio of the hydroxy groups in said polyhydric alcohol component to carboxyl groups in said polyacrboxylic acid component being within the range of about 1.0:1 to about 1.6:1, said components forming integral recurring ester units of the polyesteramide molecular chain through an oxy-carbonyl linkage.

16. A polyesteramide according to claim 15 wherein said polyhydric aliphatic or cycloaliphatic alcohol is seselected from the group consisting of ethylene glycol, propylene glycol, dipropylene glycol, tripropylene glycol, hexamethylene glycol, diethylene glycol, triethylene glycol, butylene glycol, hexylene glycol, neopentyl glycol, 1,4-cyclohexanedimethanol, hydroxypivalyl hydroxypivalate and 2,2,4-trimethylpentane-1,3-diol; and said polycarboxylic acid component is selected from the group consisting of diglycolic acid, maleic acid, succinic acid, glutaric acid, adipic acid, suberic acid, sebacic acid, phthalic acid, isophthalic acid, terephthalic acid, diglycolic anhydride, maleic anhydride, succinic anhydride, glutaric anhydride and phthalic anhydride.

References Cited

UNITED STATES PATENTS 3,447,916   6/1969   Edwards et al. _____ 44—62

OTHER REFERENCES

Bjorksten, Polyesters and Their Applications, Reinhold, New York, 1956, pp. 41–42.

MELVIN GOLDSTEIN, Primary Examiner

U.S. Cl. X.R.

117—132 B; 260—29.2 N

PO-1050
(5/69)

UNITED STATES PATENT OFFICE
CERTIFICATE OF CORRECTION

Patent No. 3,652,501                    Dated March 28, 1972

Inventor(s) Kenneth H. Albers, Alden E. Blood, Thomas C. Snapp, Jr.

It is certified that error appears in the above-identified patent and that said Letters Patent are hereby corrected as shown below:

Column 2, line 69, after the word "are", insert ---of---;

Column 3, line 51, delete "scids" and insert ---acids---;

Column 9, line 25, delete "11" and insert ---7---;
         line 31, delete "6" and insert ---5---;
         line 46, delete "said" and insert ---acid---;

Column 10, correct the formula to read

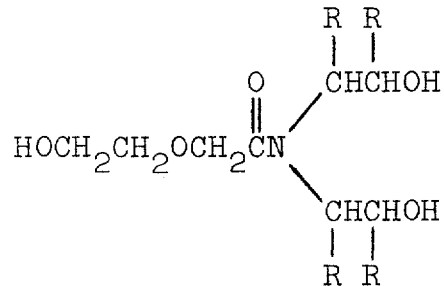

Column 10, line 23, delete "polyhdric" and insert ---polyhydric---

Signed and sealed this 1st day of August 1972.

(SEAL)
Attest:

EDWARD M. FLETCHER, JR.          ROBERT GOTTSCHALK
Attesting Officer                Commissioner of Patents